(No Model.) 3 Sheets—Sheet 1.
M. HOGAN.
WATER CLOSET.
No. 267,786. Patented Nov. 21, 1882.
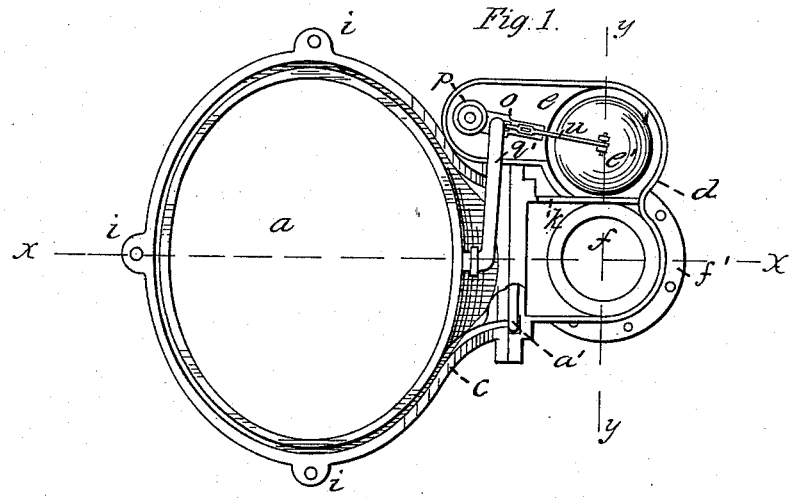
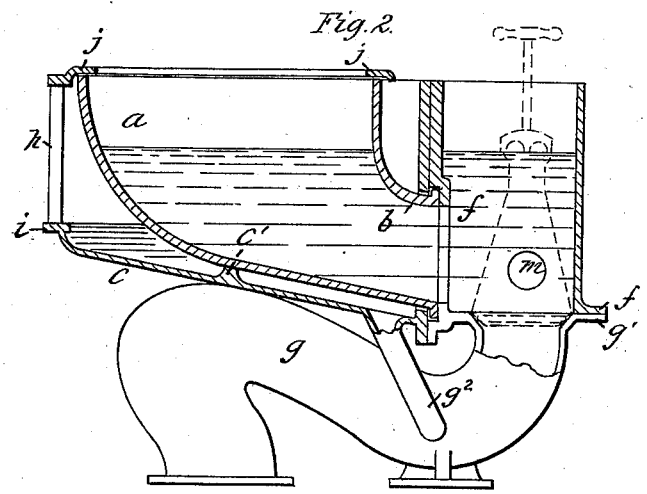
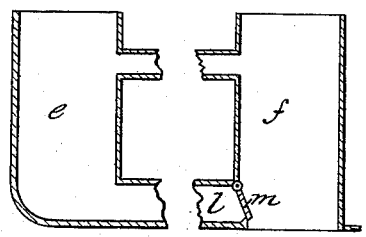
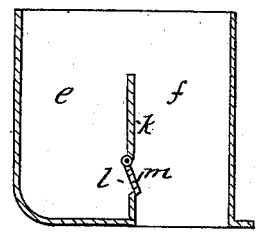
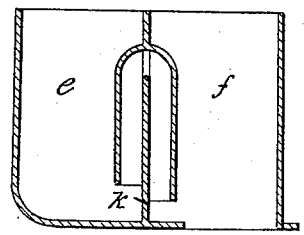
Witnesses:
Chas. L. Burdett.
W. H. Marsh
Inventor:
Matthew Hogan
By W. E. Simonds,
Atty.

(No Model.) 3 Sheets—Sheet 2.
M. HOGAN.
WATER CLOSET.
No. 267,786. Patented Nov. 21, 1882.
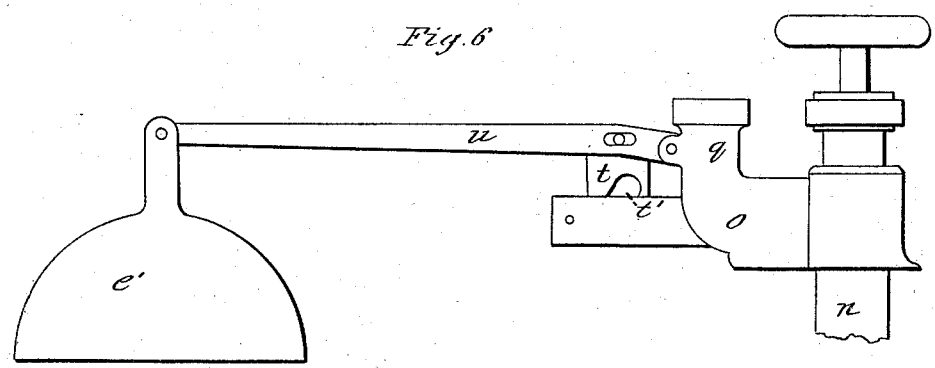
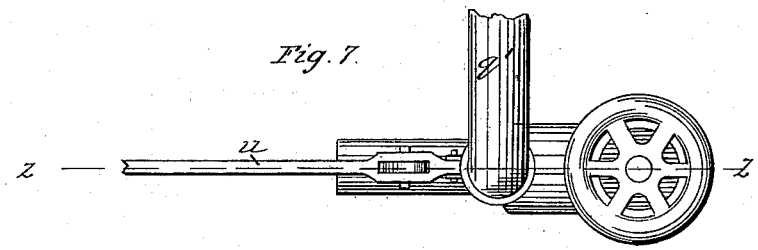
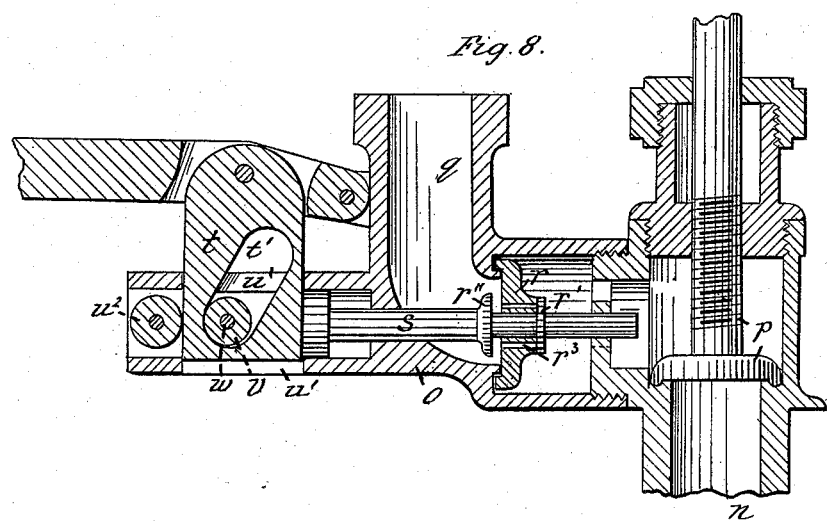
Witnesses:
Chas. L. Burdett.
N. H. Marsh.
Inventor:
Matthew Hogan
By W. E. Simonds,
Atty.

(No Model.) 3 Sheets—Sheet 3.

M. HOGAN.
WATER CLOSET.

No. 267,786. Patented Nov. 21, 1882.

Witnesses:
Chas. L. Burdett.
N. H. Marsh.

Inventor:
Matthew Hogan
By W. E. Simonds,
Atty

UNITED STATES PATENT OFFICE.

MATTHEW HOGAN, OF HARTFORD, CONNECTICUT.

WATER-CLOSET.

SPECIFICATION forming part of Letters Patent No. 267,786, dated November 21, 1882.

Application filed March 16, 1882. (No model.)

*To all whom it may concern:*

Be it known that I, MATTHEW HOGAN, of Hartford, in the county of Hartford and State Connecticut, have invented certain new and useful Improvements in Water - Closets, of which the following is a description, reference being had to the accompanying drawings, where—

Figure 9:
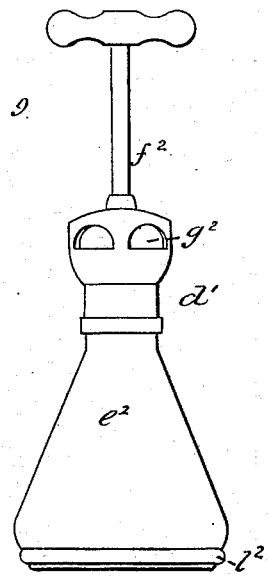
Figure 10:
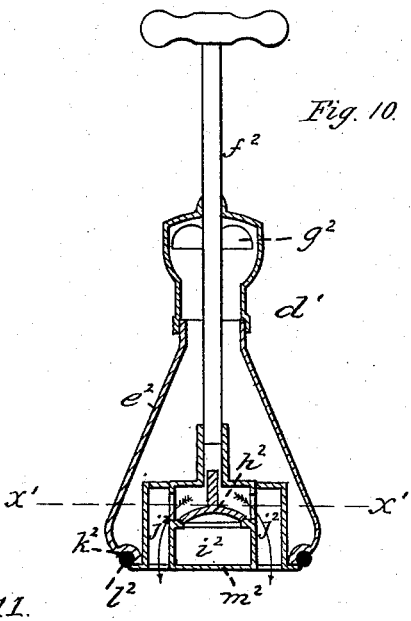
Figure 11:
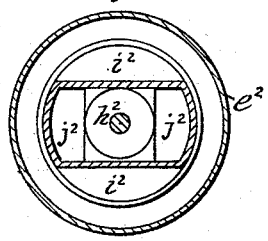
Figure 12:
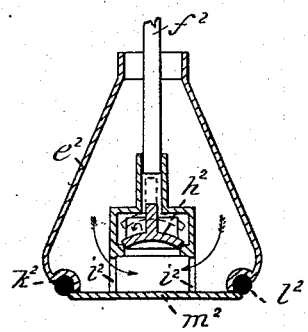
Figure 13:
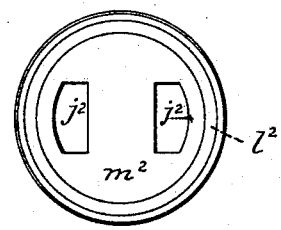

Figure 1 is a top view of my improved device, plunger removed. Fig. 2 is a view in central vertical longitudinal section on plane denoted by line $x\,x$, Fig. 1. Fig. 3 is a view in vertical section through stand-pipe and tank on line $y\,y$, Fig. 1. Fig. 4 is a view in section of a connection from tank, equivalent to that shown in Fig. 5. Fig. 5 is a view in section of a siphon - connection between the tank and pipe. Fig. 6 is a side view of the water-cock in supply-pipe and of the lever and float. Fig. 7 is a top view of the cock and lever, showing float removed. Fig. 8 is a view in longitudinal vertical section of parts shown in Fig. 7 on plane denoted by line $z\,z$. Fig. 9 is a side view of plunger. Fig. 10 is a view of the plunger in longitudinal vertical central section. Fig. 11 is a view of the plunger in cross-section on plane denoted by line $x'\,x'$, Fig. 10. Fig. 12 is a view of the plunger (top cut away) in longitudinal vertical central section on a plane at right angles to that of Fig. 10. Fig. 13 is a bottom view of the plunger.

My invention relates to the class of water-closets in which the outlet is closed by a plunger and the water-supply governed by a floating counterpoise attached to the long arm of a lever; and it consists mainly in the devices used to operate the float and the water-cock promptly, so as to secure perfect and timely action. It consists also of improved forms of plunger and valve, in connection with the parts hereinafter more fully described.

In the accompanying drawings, the letter $a$ denotes the bowl as a whole, composed of porcelain or like ware, and provided at the neck $b$ with an outwardly-turned flange, $a'$, which is held between the cast-iron pan $c$ and the casting $d$, which is formed into the tank $e$ and plunger-chamber $f$. Flanges are provided on the pan $c$ and the casting $d$, by means of which the parts are held together by bolts, and flange $f'$ is perforated for bolts, which secure the whole to the upper part of trap $g$ at the flange $g'$. The trap is of ordinary form and supports the pan $c$, which is provided with upward-projecting lug $c'$, for the support of the bowl, about under its center. A rim, $j$, rests upon pan $c$ through the medium of standards $h$, secured to lugs $i$ of the pan, and to the rim by any suitable method, as screws and nuts. This arrangement serves to prevent any weight from coming upon the bowl, and also serves to hold it firmly in place against the castings. The pan serves to catch any water that may leak from the bowl, and is connected by a waste-pipe, $g^2$, with any suitable outlet, as trap $g$, and, if desired, the waste-pipe may be provided with an additional trap as a safeguard against upward flow of sewer-gas.

Tank $e$ and plunger-chamber $f$ are separated by a partition, $k$, having its upper edge on the level at which the water is to stand in the bowl, and provided near its lower limit with an opening, $l$, covered by a flap-valve, $m$, arranged to close by its weight against the flow of water into the tank $e$, but allowing free flow from it.

The water-pipe $n$ enters the tank $e$ near one side, and is provided with a cock, $o$, having a valve, $p$, (operated by the hand-wheel from above,) for closing the main pipe during repairs to the closet or in case of leak; also, a branch, $q$, for connecting with the bowl, as by pipe $q'$. This branch is opened and closed by a disk-valve, $r$, arranged to play between collars $r'\,r''$, appurtenant to the valve-stem $s$, which is reciprocated by the wedge $t$, pivotally connected with lever $u$, and having a diagonal slot, $t'$, in which slot works the friction-roll $v$, held by pin $w$, between the forked end of stem $s$. The wedge $t$ moves in the slotted seat $u'$ against the friction-roll $u''$. The lever $u$ is pivotally connected to branch $q$ at one end, and is supplied at the opposite end of the long arm with a float, $e'$, suspended in tank $e$. When in use the water stands in cock $o$ against the disk $r$, and when the float is depressed the wedge $t$ forces back the stem $s$ and collar $r'$, opening the perforations $r^3$ and slightly relieving the pressure by the flow of water through them. As the float continues to fall the disk is forced from its seat and the water rushes into the bowl.

The outlet of the closet in plunger-chamber $f$ is provided with a plunger, $d'$, composed of metallic shell $e^2$, stem $f^2$, overflow $g^2$, and interior valve, $h^2$. The valve-casing $m^2$ is inserted into the plunger-shell from below, and is held in place by means of the rod $f^2$, which is secured by any ordinary means in the socket in the upper part of the casing. The opening $g^2$ is for overflow of surplus water from the bowl and is also the inlet to the plunger, and is best described as the "overflow-inlet" $g^2$. The valve-casing is provided with openings $i^2$, through which the water inside the plunger-case flows and presses against the lower face of valve $h^2$, raising it so that the water has a free passage through the outlets $j^2$ to the main soil-pipe by way of the usual trap. So long as the overflow of water in the bowl continues the valve $h^2$ is supported by the weight of the water-column in the plunger-case; but as soon as the flow of water into the bowl ceases the column is lowered and the valve $h^2$ drops to its seat, leaving a short column (that equal to the weight of the valve $h^2$) to act as a seal against backward flow of gases from the main trap. The plunger is provided near its lower edge with an annular groove, $k^2$, into which is fitted a packing-ring, $l^2$, (preferably of rubber,) to form a tight joint between the plunger and its seat in the outlet-pipe.

The closet and various parts are suitably arranged for use by inclosing them in wood-work in any ordinary manner.

When it is desired to empty the closet the plunger is raised and the contents are carried with the water by way of the trap $g$ into the sewer. The lowering of the water in the plunger-chamber opens the valve $m$ in partition $k$, and the water flows from tank $e$, lowering the float and opening valve $r$, supplying fresh water to the bowl. When the plunger is replaced on its seat the outlet is closed and the water rises in the bowl and plunger-chamber until it pours over the overflow of the partition and rapidly fills tank $e$, whose capacity is small in comparison with that of the bowl and chamber, and the float is suddenly raised, closing valve $r$ promptly.

Prior to my invention the float operating the supply-valve of a water-closet has been raised gradually with the consequent difficulty of slow closing of the valve and imperfect operation. These difficulties are obviated by my invention, the main feature of which—withdrawing the water from the bottom of the float-tank and returning it by a sudden supply from an adjoining or connected full chamber—may be attained by the devices shown in Figs. 4 and 5, as well as by that shown in Fig. 3.

The overflow $g^2$ of the plunger when in place is on a level slightly above that of the partition, and the water stands in the bowl at that level as any surplus flows through the plunger and discharges by means already explained into the trap $g$ until the level of the overflow is reached.

The valve $r$ is shown as opening against pressure of the water, but by reversing the valve and seat and sloping the slot $t'$ to the left the valve may be made to close against pressure.

The special form of cock herein described is not claimed, as it is made the subject-matter of another application.

I am aware of the patent to G. Conron on water-closets, of June 30, 1868, numbered 79,318, and the device therein described, and hereby disclaim the same.

I claim as my invention—

1. In a water-closet, in combination, a plunger-chamber and a tank having a communicating outlet whereby the water is drawn out of the tank when the plunger is raised, and an inlet by means of which water is not returned to the tank until after the bowl and plunger-chamber have become refilled, all substantially as described.

2. In a water-closet, in combination, bowl $a$, plunger-chamber $f$, tank $e$, partition $k$, with appurtenant valve $m$, and overflow, all substantially as described.

3. In a water-closet, in combination, bowl $a$, plunger-chamber $f$, plunger $d'$, partition $k$, valve $m$, overflow-tank $e$, cock $o$, and operating mechanism, all substantially as described.

4. In a water-closet, in combination, bowl $a$, pan $c$, casting $d$, and trap $g$, all substantially as described.

5. In a water-closet, in combination, bowl $a$, pan $c$, casting $d$, trap $g$, and waste-pipe $g^2$, all substantially as described.

6. In combination, in a plunger, a handle, $f^2$, case $e^2$, having overflow-inlet $g^2$, and outlet-passages $i^2 j^2$, interior valve, $h^2$, exterior groove, $k^2$, and packing-ring $l^2$, all substantially as described, and for the purpose set forth.

MATTHEW HOGAN.

Witnesses:
C. L. BURDETT,
W. H. MARSH.